(12) United States Patent
Matsubara

(10) Patent No.: US 7,932,963 B2
(45) Date of Patent: *Apr. 26, 2011

(54) SUBSTRATE FOR LIQUID CRYSTAL DISPLAY DEVICE, LIQUID CRYSTAL DISPLAY DEVICE PROVIDED WITH THE SAME, AND MANUFACTURING METHOD OF THE SAME

(75) Inventor: Kunio Matsubara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,900

(22) Filed: Jun. 7, 2010

(65) Prior Publication Data

US 2010/0245748 A1 Sep. 30, 2010

Related U.S. Application Data

(63) Continuation of application No. 12/109,053, filed on Apr. 24, 2008, now Pat. No. 7,782,410.

(51) Int. Cl.
G02F 1/133 (2006.01)
G02F 1/136 (2006.01)

(52) U.S. Cl. .......................... 349/39; 349/42

(58) Field of Classification Search ............... None
See application file for complete search history.

(56) References Cited

U.S. PATENT DOCUMENTS

| | | | |
|---|---|---|---|
| 5,496,752 A | 3/1996 | Nasu et al. | |
| 6,678,018 B2 * | 1/2004 | Park et al. | 349/43 |
| 6,716,768 B2 | 4/2004 | Ikuta | |
| 6,838,696 B2 * | 1/2005 | Kobayashi et al. | 257/57 |
| 2002/0018176 A1 | 2/2002 | Kobayashi et al. | |
| 2002/0057393 A1 | 5/2002 | Park et al. | |

FOREIGN PATENT DOCUMENTS

| | | |
|---|---|---|
| JP | 62-120080 | 6/1987 |
| JP | 63-077150 | 4/1988 |
| JP | 63-102367 | 5/1988 |
| JP | 64-031457 | 2/1989 |
| JP | 2-27318 | 1/1990 |
| JP | 04-267225 | 9/1992 |

(Continued)

Primary Examiner — Tina M Wong
(74) Attorney, Agent, or Firm — Greer, Burns & Crain, Ltd.

(57) ABSTRACT

The invention relates to a substrate for a liquid crystal display device, a liquid crystal display device provided with the same, and a manufacturing method of the same, and provides a substrate for a liquid crystal display device in which a manufacture process can be cut down and manufacturing cost is reduced, a liquid crystal display device provided with the same, and a manufacturing method of the same. The substrate for the liquid crystal display device includes a pixel electrode formed in each of pixel regions, a plurality of gate bus lines which are formed on a base substrate in parallel with each other and in each of which a plurality of formation materials are laminated and at least a lower layer part is formed of a same formation material as the pixel electrode, a plurality of drain bus lines intersecting with the plurality of gate bus lines through an insulating film and formed to be in parallel with each other, and a thin film transistor formed in each of the pixel regions and including a gate electrode connected to the gate bus line, a drain electrode connected to the drain bus line, and a source electrode connected to the pixel electrode.

5 Claims, 24 Drawing Sheets

FOREIGN PATENT DOCUMENTS

| | | |
|---|---|---|
| JP | 06-235939 | 8/1994 |
| JP | 07-159808 | 6/1995 |
| JP | 08-110527 | 4/1996 |
| JP | 09-092838 | 4/1997 |
| JP | 9-236827 | 9/1997 |
| JP | 10-090718 | 4/1998 |
| JP | 2001-085697 | 3/2001 |
| JP | 2001-250953 | 9/2001 |

* cited by examiner 48,44

SUBSTRATE FOR LIQUID CRYSTAL DISPLAY DEVICE, LIQUID CRYSTAL DISPLAY DEVICE PROVIDED WITH THE SAME, AND MANUFACTURING METHOD OF THE SAME

This application is a Continuation of U.S. application Ser. No. 12/109,053, filed Apr. 24, 2008, which is a Divisional of U.S. application Ser. No. 10/393,436, filed Mar. 20, 2003. now U.S. Pat. No. 7,382,420.

BACKGROUND OF THE INVENTION

1. Field of the Invention

The present invention relates to a substrate for a liquid crystal display device used for a display portion of a notebook-size personal computer, a wall-mounted television or the like, a liquid crystal display device provided with the same, and a manufacturing method of the same.

2. Description of the Related Art

In recent years, the market scale of an active matrix type color liquid crystal display device in which each pixel is provided with a thin film transistor (TFT) as a switching element, has been greatly expanded, and the production quantity has been rapidly increased. On the other hand, as the market scale of the liquid crystal display device is expanded and the production quantity is increased, the product unit price tends to lower. Thus, it is desired to provide a more efficient manufacturing process and to reduce the manufacture cost.

Here, a conventional manufacturing method of a TFT substrate in which TFTs are formed will be described. FIGS. 32A to 32F are process sectional views showing the conventional manufacturing method of the TFT substrate. In FIGS. 32A to 32F, left parts show sections in the vicinity of a TFT, and right parts show sections in the vicinity of a storage capacitor. First, a chromium (Cr) film having a thickness of 150 nm is formed on the whole surface of a transparent glass substrate 110, and pattering is carried out using a first photomask, so that a gate electrode 112 and a storage capacitor bus line 114 are formed. Next, a silicon nitride film (SiN film) which becomes an insulating film (gate insulating film) 116 and has a thickness of 400 nm, an amorphous silicon (a-Si) layer 118 having a thickness of 15 nm, and a SiN film 120 having a thickness of 120 nm are continuously formed on the whole surface of the gate electrode 112 and the storage capacitor bus line 114 by using a plasma CVD apparatus (see FIG. 32A).

Next, a resist is coated on the whole surface of the substrate, and back exposure is carried out from the back surface side (the lower part in the drawing) of the glass substrate 110 while the gate electrode 112 is used as a mask, and further, exposure using a second photomask is carried out, so that a resist pattern (not shown) is formed on the gate electrode 112 in a self-aligning manner. Next, etching is carried out while the obtained resist pattern is used as an etching mask, so that a channel protection film 122 is formed on the gate electrode 112 as shown in FIG. 32B.

Next, as shown in FIG. 32C, an $n^+$a-Si layer 124 having a thickness of 30 nm is formed on the whole surface of the channel protection film 122 by using a plasma CVD apparatus. Next, as shown in FIG. 32D, a titanium (Ti) layer having a thickness of 20 nm, an aluminum (Al) layer having a thickness of 50 nm, and a Ti layer having a thickness of 80 nm are formed on the whole surface of the $n^+$a-Si layer 124 in this order by a PVD method using a sputtering apparatus, so that a drain metal layer 126 is formed.

Next, the drain metal layer 126, the $n^+$a-Si layer 124 and the a-Si layer 118 are patterned using a third photomask, so that a drain bus line (not shown), a drain electrode 130, a source electrode 132, a storage capacitor electrode 128 and an active semiconductor layer 134 are formed as shown in FIG. 32E. In an etching treatment in the patterning, the channel protection film 122 functions as an etching stopper, and the a-Si layer 118 (active semiconductor layer 134) as a lower layer thereof is not etched but remains.

Next, as shown in FIG. 32F, a SiN film having a thickness of 300 nm is formed on the whole surface by using a plasma CVD apparatus, so that a protection film 136 is formed. Next, a fourth photomask is used to pattern the protection film 136, so that a contact hole 138 on the source electrode 132 and a contact hole 140 on the storage capacitor electrode 128 are formed. Next, an ITO (Indium Tin Oxide) layer having a thickness of 70 nm is formed on the whole surface, and a fifth photomask is used to carry out patterning, so that a pixel electrode 142 is formed. The TFT substrate is completed through the above process.

Incidentally, there are references as follows: patent document 1: JP-A-S63-77150, patent document 2: JP-A-S63-102367, patent document 3: JP-A-S64-31457, and patent document 4: JP-A-2001-250953.

As stated above, the TFT substrate is manufactured by repeating a photolithography process composed of a sequential semiconductor process of [film formation→resist coating→exposure→development→etching→resist peeling] at least four times or five times or more. The photolithography process has a long procedure, and a CVD apparatus used for the film formation and an exposure apparatus used for the exposure are expensive, and therefore, there arises a problem that it becomes a rate-determining process in a production line. In order to efficiently increase the production quantity of the TFT substrate on investment, it is necessary that the number of times the photolithography process is repeated is decreased, so that the number of all processes is compressed and the process requiring the expensive apparatus, such as the CVD apparatus and the exposure apparatus, does not become a rate-determining process.

SUMMARY OF THE INVENTION

An object of the present invention is to provide a substrate for a liquid crystal display device in which a manufacture process can be cut down and manufacturing cost is reduced, a liquid crystal display device provided with the same, and a manufacturing method of the same.

The above object is achieved by a substrate for a liquid crystal display device, characterized by comprising pixel regions arranged in a matrix form on a base substrate, a pixel electrode formed in each of the pixel regions, a plurality of gate bus lines which are formed on the substrate in parallel with each other and in each of which a plurality of formation materials are laminated and at least a lower layer part is formed of a same formation material as the pixel electrodes, a plurality of drain bus lines intersecting with the plurality of gate bus lines through an insulating film and formed to be in parallel with each other, and a thin film transistor formed in each of the pixel regions and including a gate electrode connected to the gate bus line, a drain electrode connected to the drain bus line, and a source electrode connected to the pixel electrode.

DETAILED DESCRIPTION OF THE PREFERRED EMBODIMENTS

Figure 1:
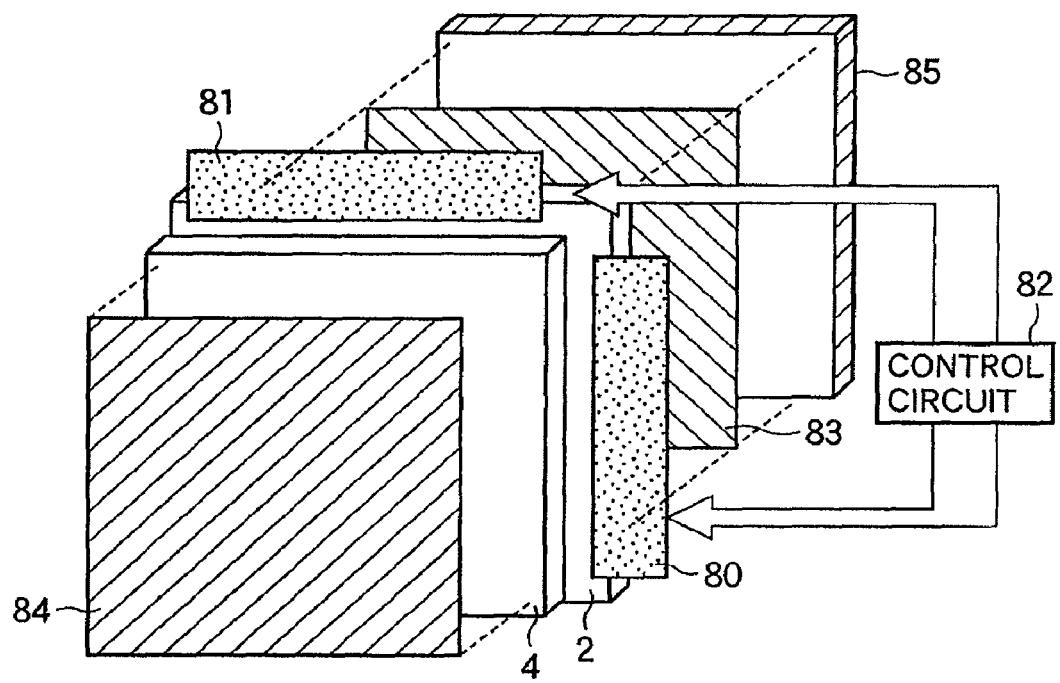
FIG. 1 is a view showing a schematic structure of a liquid crystal display device according to an embodiment of the invention.

A substrate for a liquid crystal display device according to an embodiment of the invention, a liquid crystal display device provided with the same, and a manufacturing method of the same will be described with reference to FIGS. 1 to 31C. FIG. 1 shows a schematic structure of a liquid crystal display device according to this embodiment. The liquid crystal display device has such a structure that a TFT substrate (base substrate) 2 on which TFTs and the like are formed is made to be opposite to and is bonded to a CF substrate 4 on which CFs and the like are formed, and a liquid crystal is sealed between both the substrates 2 and 4. Gate bus lines and storage capacitor bus lines, and drain bus lines are formed on the TFT substrate 2 to intersect each other through an insulating film.

The TFT substrate 2 is provided with a gate bus line driving circuit 80 in which a driver IC for driving the plurality of gate bus lines is mounted and a drain bus line driving circuit 81 in which a driver IC for driving the plurality of drain bus lines is mounted. These driving circuits 80 and 81 output a scanning signal and a data signal to a predetermined gate bus line and a drain bus line on the basis of a predetermined signal outputted from a control circuit 82. A polarizing plate 83 is disposed on a substrate surface of the TFT substrate 2 opposite to an element formation surface, and a back light unit 85 is attached to a reverse surface of the polarizing plate 83 with respect to the TFT substrate 2. On the other hand, a polarizing plate 84 disposed in crossed Nicols with respect to the polarizing plate 83 is bonded to a surface of the CF substrate 4 opposite to a CF formation surface.

Figure 2:
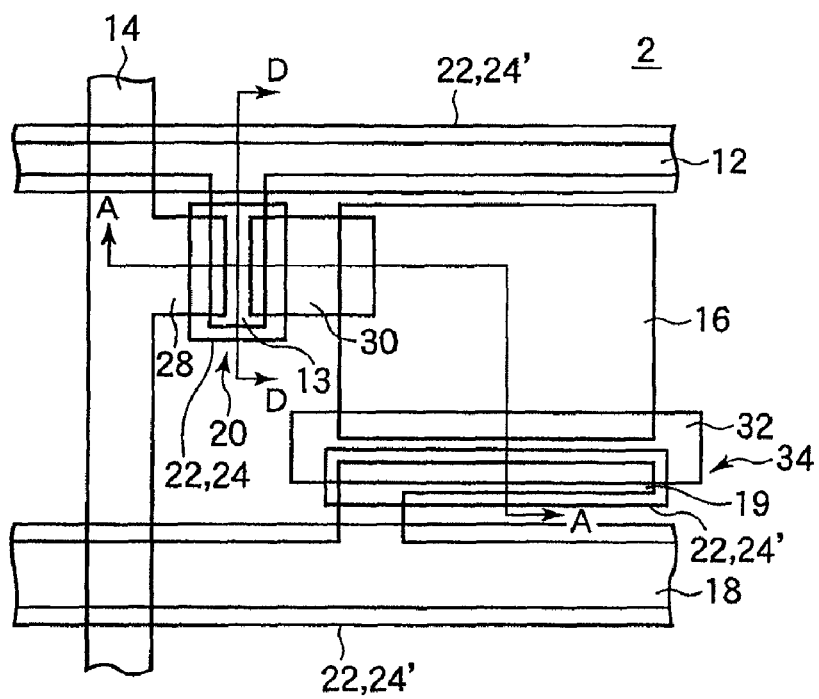
FIG. 2 is a view showing a schematic structure of one pixel of a substrate for a liquid crystal display device according to the embodiment of the invention.
Figure 3:
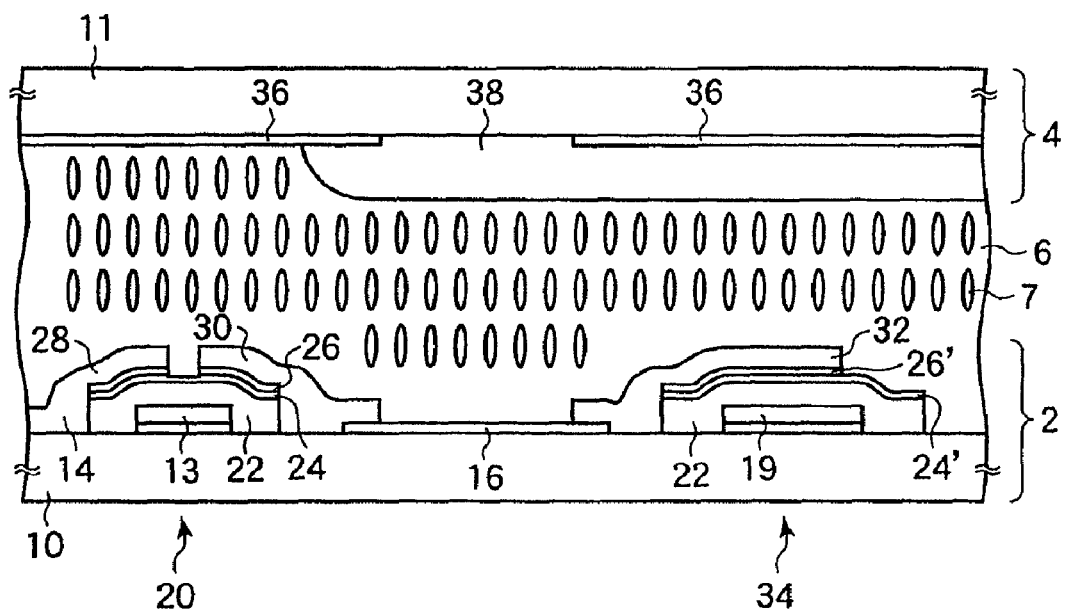
FIG. 3 is a sectional view showing a structure of the liquid crystal display device taken along line A-A of FIG. 2.

FIG. 2 shows a schematic structure of one pixel of the TFT substrate 2 of the liquid crystal display device according to this embodiment. FIG. 3 is a sectional view of the liquid crystal display device taken along line A-A of FIG. 2. As shown in FIGS. 2 and 3, the TFT substrate 2 include a pixel electrode 16 made of, for example, ITO in each of pixel regions disposed in a matrix form on a transparent glass substrate 10. A plurality of gate bus lines 12 extending in the horizontal direction in FIG. 2 are formed substantially in parallel with each other (FIG. 2 shows only one line). The gate bus line 12 is formed such that the same formation material as the pixel electrode 16 and, for example, molybdenum nitride (MoN), Al, MoN, molybdenum (Mo) are laminated in this order.

Besides, a plurality of storage capacitor bus lines 18 are formed substantially in parallel with each other and substantially in parallel with the gate bus lines 12 across the pixel electrode 16 (FIG. 2 shows only one line). The storage capacitor bus line 18 is formed of the same material as the gate bus line 12.

A plurality of drain bus lines 14 extending in the vertical direction in FIG. 2 are formed in parallel with each other to intersect with the gate bus lines 12 through an insulating film (FIG. 2 shows only one line). The drain bus line 14 is formed such that, for example, MoN, Al, MoN and Mo are laminated in this order.

A TFT 20 is formed in each pixel region in the vicinity of an intersecting position of the gate bus line 12 and the drain bus line 14. The TFT 20 includes a gate electrode 13 led out from the gate bus line 12. An insulating film (gate insulating film) 22 is selectively formed on the gate electrode 13. An active semiconductor layer 24 and an ohmic contact layer 26 are formed in this order on the insulating film 22. A drain electrode 28 led out from the drain bus line 14 and a source electrode 30 electrically connected to the pixel electrode 16 are formed on the ohmic contact layer 26. The drain electrode 28 and the ohmic contact layer 26 as the lower layer thereof are electrically separated from the source electrode 30 and the ohmic contact layer 26 as the lower layer thereof by channel etching.

Figure 4:
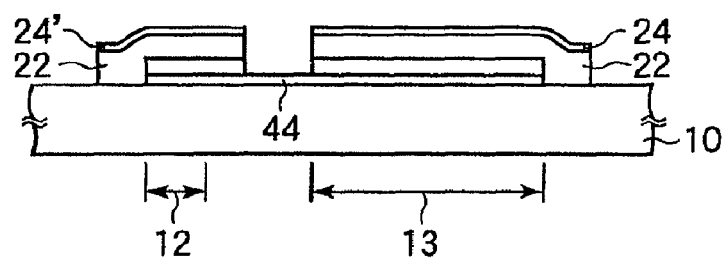
FIG. 4 is a sectional view showing a structure of the liquid crystal display device taken along line D-D of FIG. 2.

FIG. 4 is a sectional view of the vicinity of the TFT 20 of the TFT substrate 2 taken along line D-D of FIG. 2. As shown in FIG. 4, the gate electrode 13 is connected to the gate bus line 12 only through a transparent electrode layer 44 made of the same formation material as the pixel electrode 16. Besides, the active semiconductor layer 24 is separated from an a-Si layer 24' on the gate bus line 12 so as to be separated for each of the TFTs 20.

Besides, the TFT substrate 2 includes a storage capacitor 34 in each pixel. The storage capacitor 34 includes a storage capacitor branch wiring line 19 led out from the storage capacitor bus line 18 through a transparent electrode layer, an insulating film 22 selectively formed on the storage capacitor branch wiring line 19, an a-Si layer 24', an n⁺a-Si layer 26', and a storage capacitor electrode 32 electrically connected to the pixel electrode 16 and formed of the same material as the drain bus line 14. Although not shown, in a part below the storage capacitor bus line 18 in FIG. 2, the gate bus line 12 for driving a lower pixel is formed to be adjacent to and a predetermined distance away from it.

The CF substrate 4 disposed to be opposite to the TFT substrate 2 includes a light shielding film (BM) 36 on a glass substrate 11, for shading a region other than a pixel region. Besides, a CF 38 of one color of red (R), green (G) and blue (B) is formed on the BM 36 and its opening.

A liquid crystal layer 6 is sealed between the TFT substrate 2 and the CF substrate 4. Respective liquid crystal molecules 7 are aligned, for example, almost vertically to the substrate surface in a state where a voltage is not applied.

Figure 5:
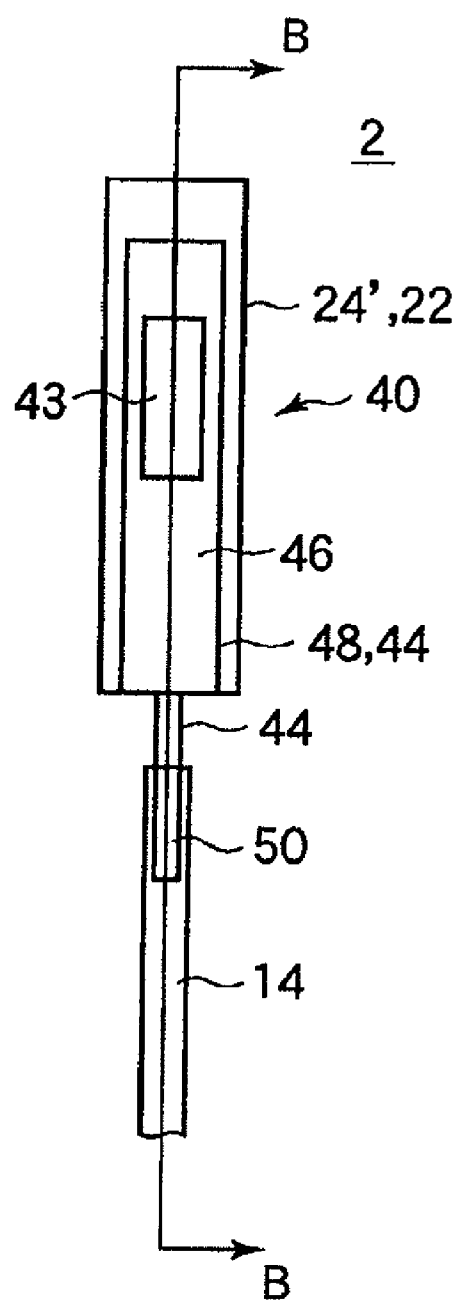
FIG. 5 is a view showing a structure of a drain bus line terminal of the substrate for the liquid crystal display device according to the embodiment of the invention.
Figure 6:
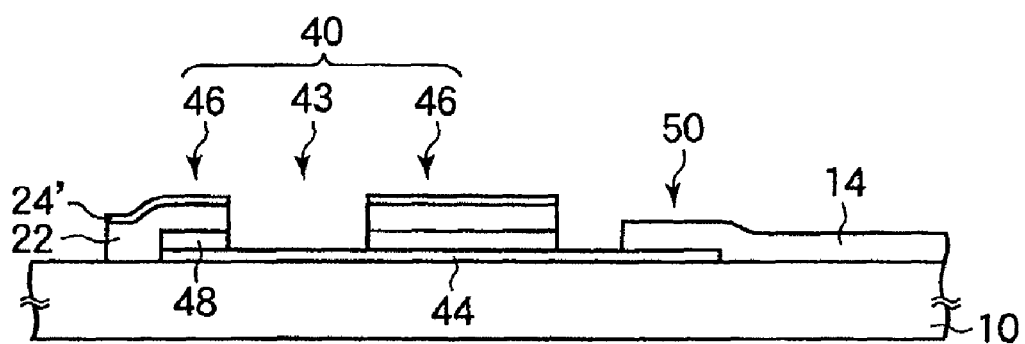
FIG. 6 is a sectional view showing a structure of the liquid crystal display device taken along line B-B of FIG. 5.

FIG. 5 shows a structure in the vicinity of a drain bus line terminal of the substrate for the liquid crystal display device according to this embodiment. FIG. 6 is a sectional view showing a structure of the substrate for the liquid crystal display device taken along line B-B of FIG. 5. As shown in FIGS. 5 and 6, a drain bus line terminal 40 is formed at one end of the drain bus line 14. The drain bus line terminal 40 and the drain bus line 14 are electrically connected to each other at a changeover region 50. The drain bus line terminal 40 includes an outer frame part 46 formed at the periphery to make the existence of the drain bus line terminal 40 clear and an opening 43 used for electrical connection to the outside. The outer frame part 46 is formed such that a metal layer 48 made of the same formation material as an upper layer part of the gate bus line 12, the insulating film 22 and the a-Si layer 24' are laminated. The opening 43 is formed of only a transparent electrode layer 44 made of the same formation material as the pixel electrode 16. Incidentally, when the changeover region 50 is disposed inside a seal agent coated region where a seal agent is coated in a subsequent step, the insulating film 22 is formed on substantially the whole metal wiring line (metal layer 48) in the seal agent coated region and a region (region not coming in contact with the liquid crystal layer 6) outside the seal agent coated region and exposed after completion of a liquid crystal display panel. Thus, passivation of the metal wiring line is possible.

Figure 7:
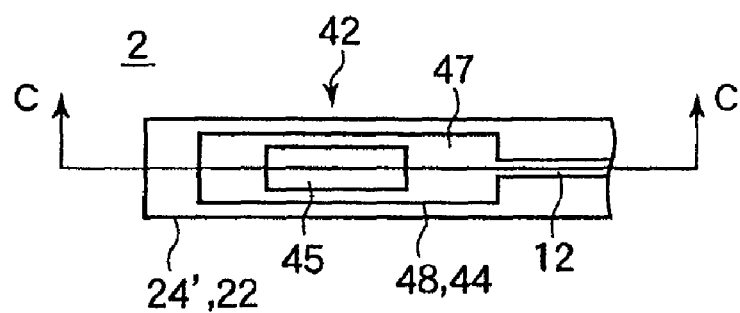
FIG. 7 is a view showing a structure of a gate bus line terminal of the substrate for the liquid crystal display device according to the embodiment of the invention.
Figure 8:
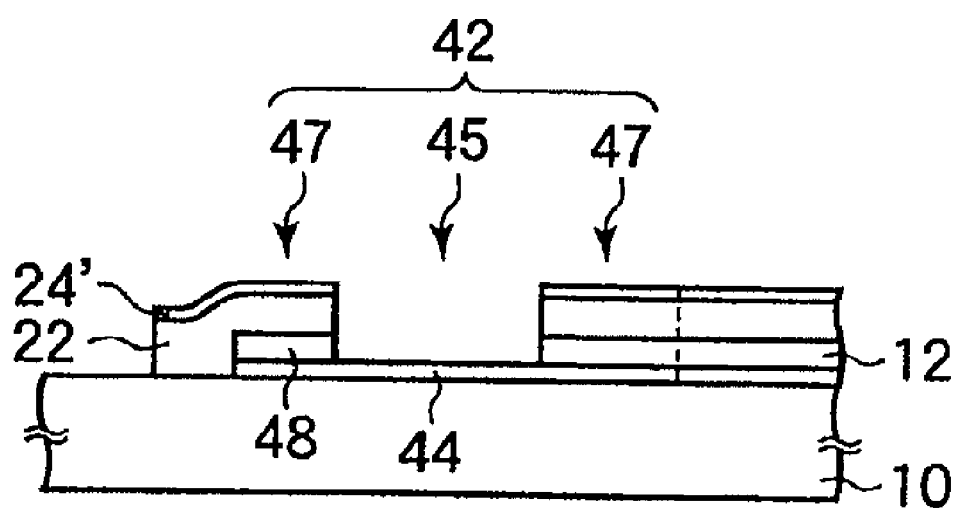
FIG. 8 is a sectional view showing a structure of the liquid crystal display device taken along line C-C of FIG. 7.

FIG. 7 shows a structure in the vicinity of a gate bus line terminal of the substrate for the liquid crystal display device according to this embodiment. FIG. 8 is a sectional view showing a structure of the substrate for the liquid crystal display device taken along line C-C of FIG. 7. As shown in FIGS. 7 and 8, a gate bus line terminal 42 is formed at one end of the gate bus line 12. The gate bus line terminal 42 includes an outer frame part 47 formed at the periphery to make the existence of the gate bus line terminal 42 clear, and an opening 45 used for electrical connection with the outside. Similarly to the outer frame part 46, the outer frame part 47 is formed such that the metal layer 48 made of the same formation material as the upper layer part of the gate bus line 12, the insulating film 22 and the a-Si layer 24' are laminated. The opening 45 is formed of only the transparent electrode layer 44 made of the same formation material as the pixel electrode 16 and the lower layer part of the gate bus line 12.

Next, a manufacturing method of the substrate for the liquid crystal display device according to this embodiment will be described with reference to FIGS. 9A to 23. FIGS. 9A to 9E, FIGS. 15A to 15D and FIGS. 18A to 18D correspond to FIG. 3 and are process sectional views of the substrate for the liquid crystal display device taken along the line A-A of FIG. 2. FIGS. 10A to 10E, FIGS. 16A to 16D and FIGS. 19A to 19D correspond to FIG. 6 and are process sectional views of the substrate for the liquid crystal display device taken along the line B-B of FIG. 5. Besides, FIGS. 11A to 11E, FIGS. 17A to 17D and FIGS. 20A to 20D correspond to FIG. 8 and are process sectional views of the substrate for the liquid crystal display device taken along line C-C of FIG. 7. FIGS. 12 and 21 correspond to FIG. 2 and are views for explaining the process, and FIGS. 13 and 22 correspond to FIG. 5 and are views for explaining the process. Besides, FIGS. 14 and 23 correspond to FIG. 7 and are views for explaining the process.

Figure 9A:
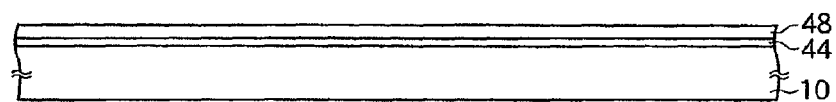
FIGS. 9A to 9E are process sectional views showing a manufacturing method of the substrate for the liquid crystal display device according to the embodiment of the invention.
Figure 10A:
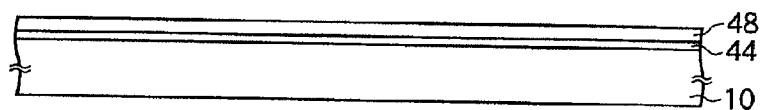
FIGS. 10A to 10E are process sectional views showing the manufacturing method of the substrate for the liquid crystal display device according to the embodiment of the invention.
Figure 11A:
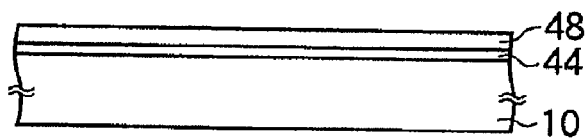
FIGS. 11A to 11E are process sectional views showing the manufacturing method of the substrate for the liquid crystal display device according to the embodiment of the invention.
Figure 12:
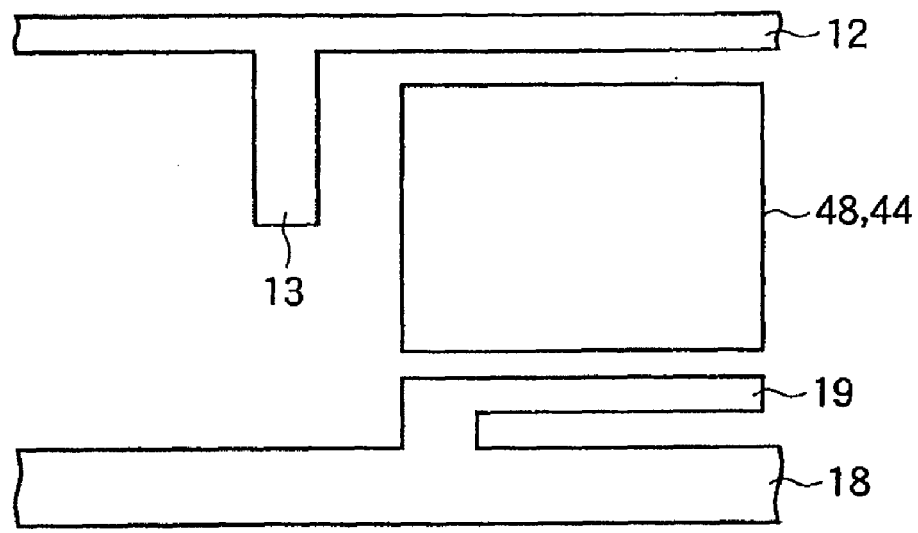
FIG. 12 is a view showing the manufacturing method of the substrate for the liquid crystal display device according to the embodiment of the invention.
Figure 13:
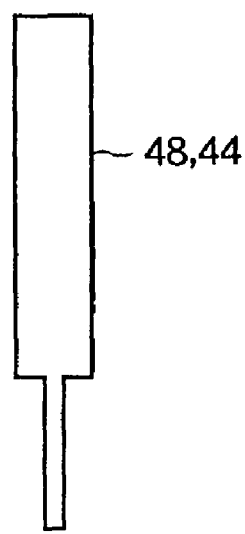
FIG. 13 is a view showing the manufacturing method of the substrate for the liquid crystal display device according to the embodiment of the invention.
Figure 14:
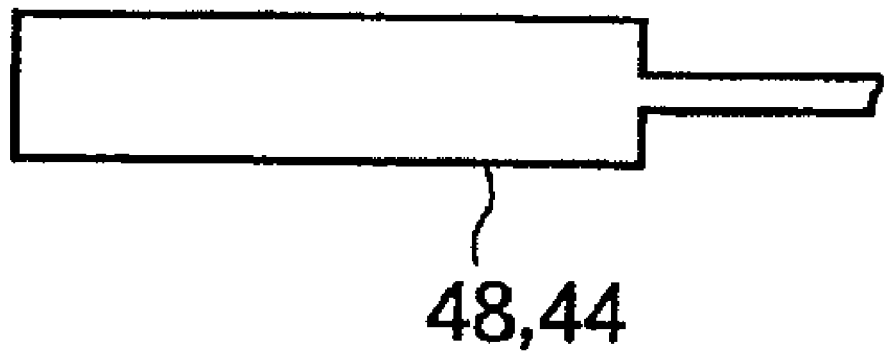
FIG. 14 is a view showing the manufacturing method of the substrate for the liquid crystal display device according to the embodiment of the invention.

First, as shown in FIGS. 9A, 10A and 11A, for example, an ITO layer having a thickness of 70 nm, an MoN layer having a thickness of 50 nm, an Al layer having a thickness of 150 nm, an MoN layer having a thickness of 90 nm and an Mo layer having a thickness of 10 nm are continuously formed in this order on the whole surface of the glass substrate 10, so that the transparent electrode layer 44 and the metal layer 48 are formed.

Figure 9B:
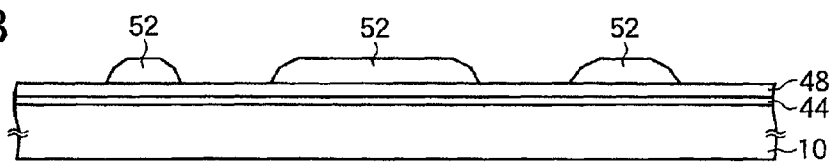
Figure 10B:
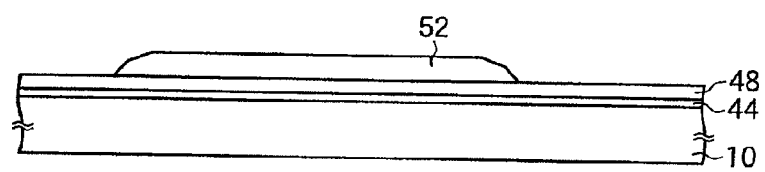
Figure 11B:
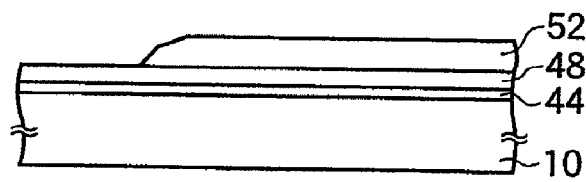

Next, a resist is coated on the whole surface of the substrate, exposure is carried out with a first photomask, and development is carried out, so that a resist pattern 52 as shown in FIGS. 9B, 10B and 11B is formed. The resist pattern 52 is formed on the respective formation regions of the gate bus line 12, the gate electrode 13, the storage capacitor bus line 18, the storage capacitor branch wiring line 19, the pixel electrode 16, the drain bus line terminal 40 and the gate bus line terminal 42.

Figure 9C:
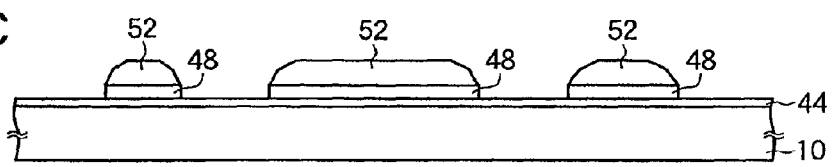
Figure 9D:
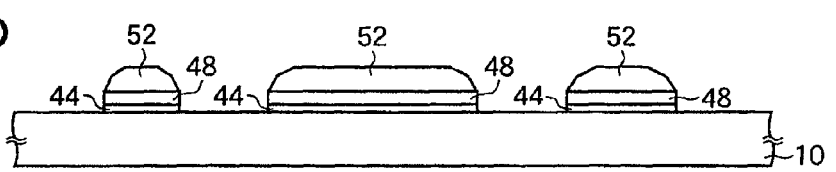
Figure 9E:
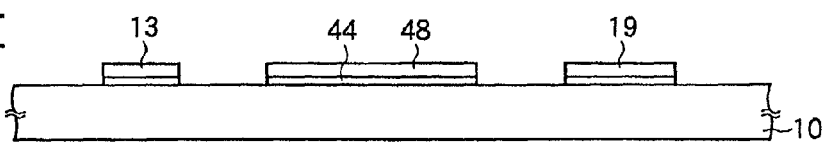
Figure 10C:
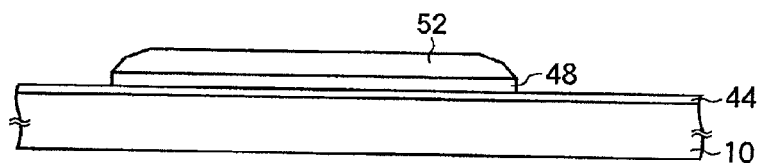
Figure 10D:
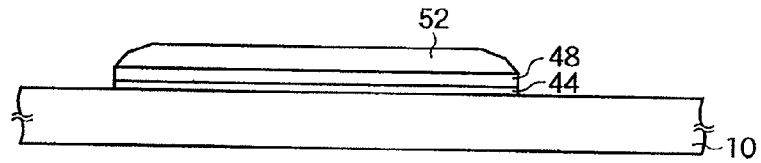
Figure 10E:
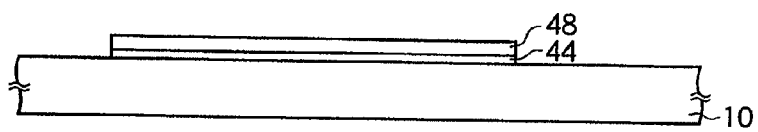
Figure 11C:
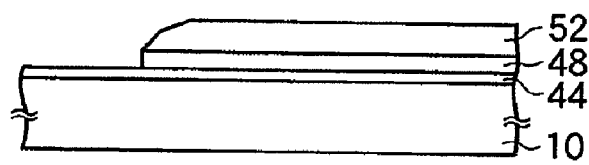
Figure 11D:
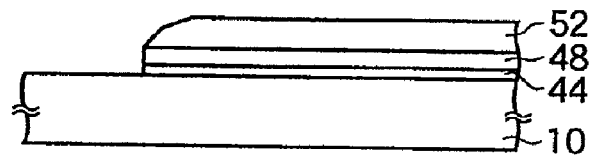
Figure 11E:
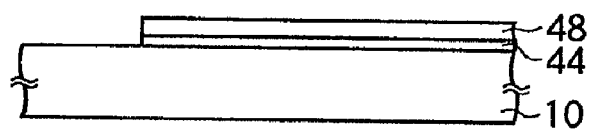

Next, as shown in FIGS. 9C, 10C and 11C, while the resist pattern 52 is used as an etching mask, the metal layer 48 is etched. Next, as shown in FIGS. 9D, 10D and 11D, while the resist pattern 52 is again used as the etching mask, the transparent electrode layer 44 is etched.

Next, as shown in FIGS. 9E, 10E, 11E, 12 to 14, the resist pattern 52 is peeled off. By this, the gate bus line 12, the gate electrode 13, the storage capacitor bus line 18 and the storage capacitor branch wiring line 19 are formed. Incidentally, in this embodiment, although the metal layer 48 and the transparent electrode layer 44 are etched in the separate steps, the metal layer 48 and the transparent electrode layer 44 may be etched at the same time while the resist pattern 52 is used as the etching mask. Besides, in this embodiment, although the transparent electrode layer 44 is etched while the resist pattern 52 is used as the etching mask, the resist pattern 52 may be peeled off before the transparent electrode layer 44 is etched, and the transparent electrode layer 44 may be etched while the metal layer 48 is used as the etching mask.

Figure 15A:
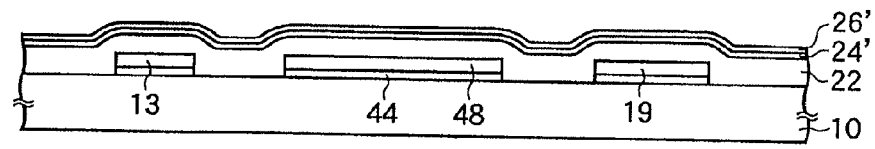
FIGS. 15A to 15D are process sectional views showing the manufacturing method of the substrate for the liquid crystal display device according to the embodiment of the invention.
Figure 16A:
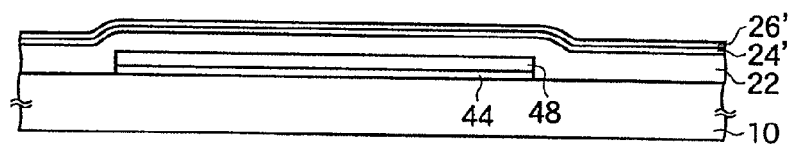
FIGS. 16A to 16D are process sectional views showing the manufacturing method of the substrate for the liquid crystal display device according to the embodiment of the invention.
Figure 17A:
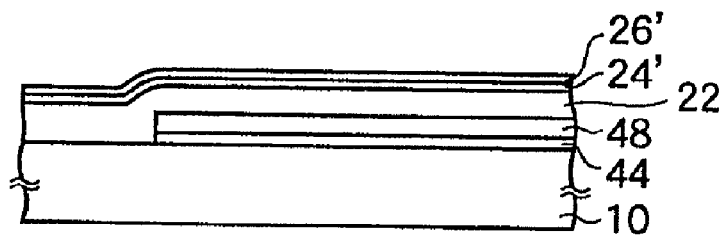
FIGS. 17A to 17D are process sectional views showing the manufacturing method of the substrate for the liquid crystal display device according to the embodiment of the invention.

Next, as shown in FIGS. 15A, 16A and 17A, for example, the insulating film 22 made of an SiN film having a thickness of 400 nm, the a-Si layer 24' having a thickness of 50 nm and the n$^+$a-Si layer 26' having a thickness of 50 nm are continuously formed on the whole surface of the substrate.

Figure 15B:
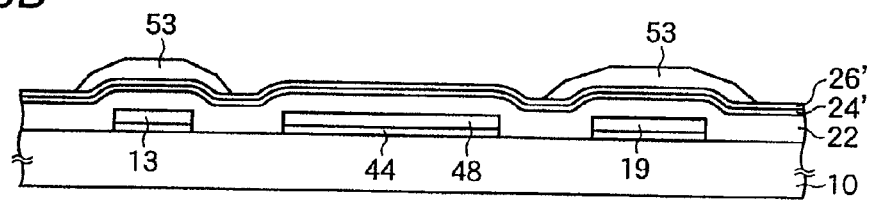
Figure 16B:
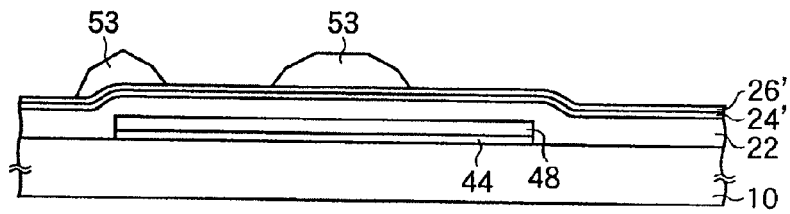
Figure 17B:
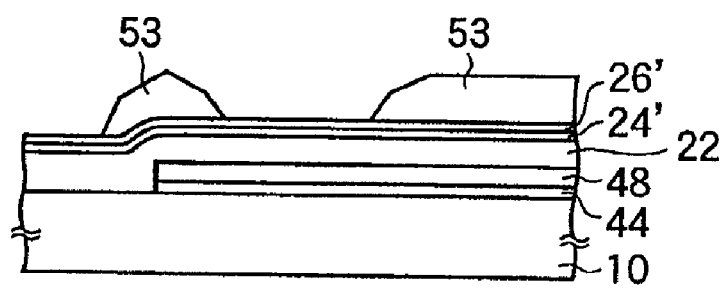

Next, a resist is coated on the whole surface of the substrate, exposure is carried out with a second photomask, and development is carried out, so that a resist pattern 53 as shown in FIGS. 15B, 16B and 17B is formed. The resist pattern 53 is formed in the respective formation regions of the gate bus line 12, the gate electrode 13, the storage capacitor bus line 18, the storage capacitor branch wiring line 19, the outer frame part 46 of the drain bus line terminal 40 and the outer frame part 47 of the gate bus line terminal 42 and their peripheries. Although not shown, in the resist pattern 53, the formation region of the gate bus line 12 and the formation region of the gate electrode 13 are separated from each other to have a predetermined interval. Besides, in the resist pattern 53, the formation region of the storage capacitor bus line 18 and the formation region of the storage capacitor branch wiring line 19 are separated from each other to have a predetermined interval.

Figure 15C:
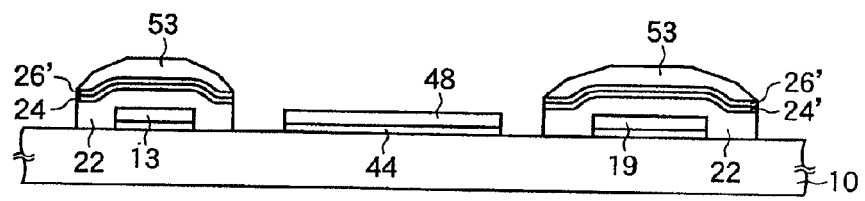
Figure 15D:
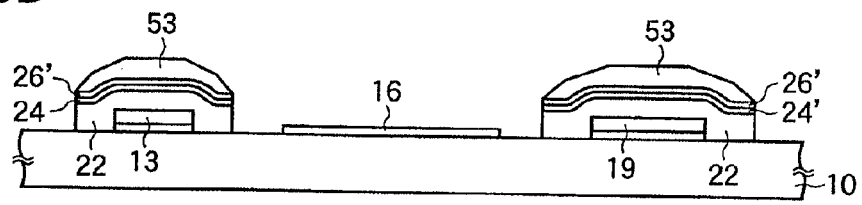
Figure 16C:
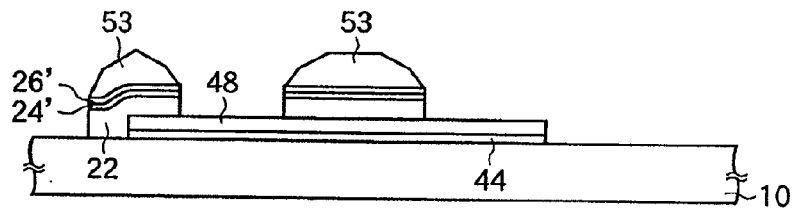
Figure 16D:
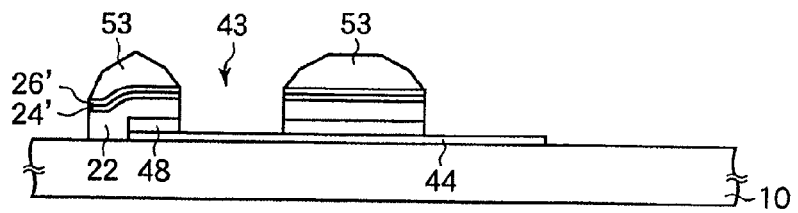
Figure 17C:
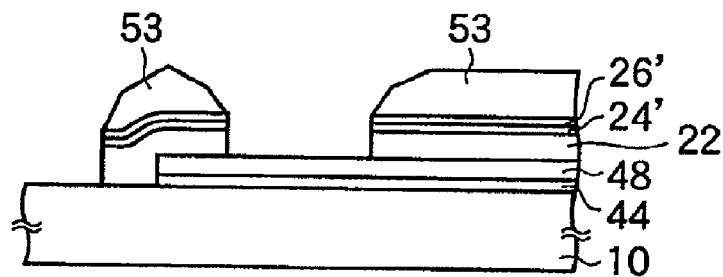
Figure 17D:
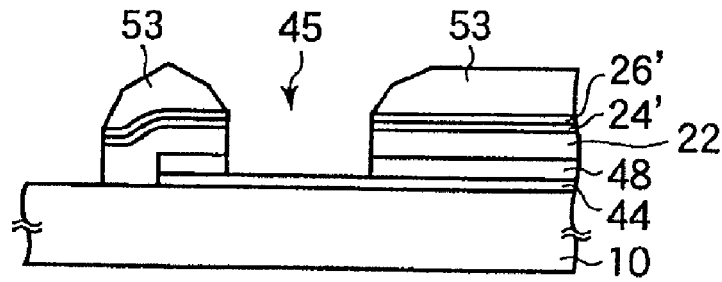

Next, as shown in FIGS. 15C, 16C and 17C, while the resist pattern 53 is used as an etching mask, the n$^+$a-Si layer 26', the a-Si layer 24' and the insulating film 22 are etched at the same time. By this, the active semiconductor layer 24 separated for each pixel and the n$^+$a-Si layer 26' over the storage capacitor branch wiring line 19 are formed, and the metal layer 48 in the pixel region, the formation region of the drain bus line terminal 40 and the formation region of the gate bus line terminal 42 is exposed. Subsequently, the exposed metal layer 48 is removed by etching (see FIGS. 15ID, 16D and 17D). By this, the pixel electrode 16, the opening 43 of the drain bus line terminal 40 and the opening 45 of the gate bus line terminal 42 are formed.

Figure 18A:
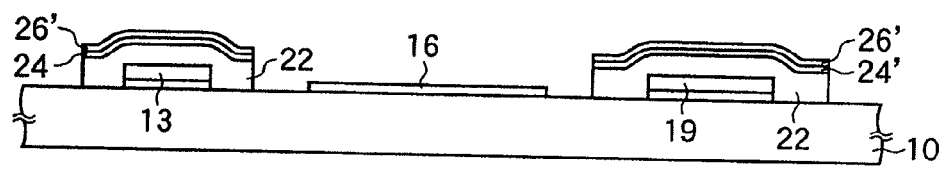
FIGS. 18A to 18D are process sectional views showing the manufacturing method of the substrate for the liquid crystal display device according to the embodiment of the invention.
Figure 18B:
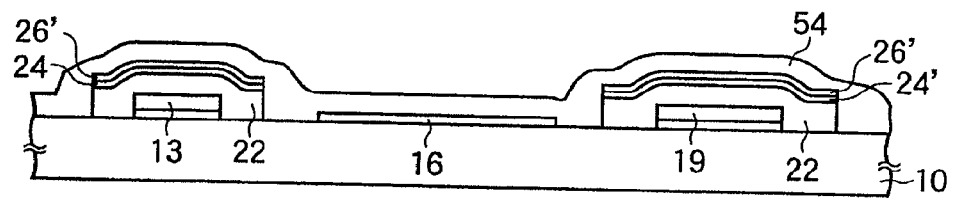
Figure 19A:
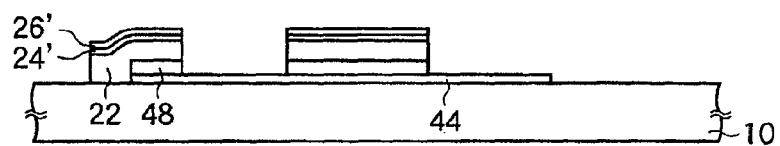
FIGS. 19A to 19D are process sectional views showing the manufacturing method of the substrate for the liquid crystal display device according to the embodiment of the invention.
Figure 19B:
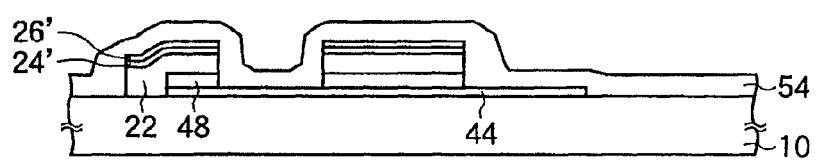
Figure 20A:
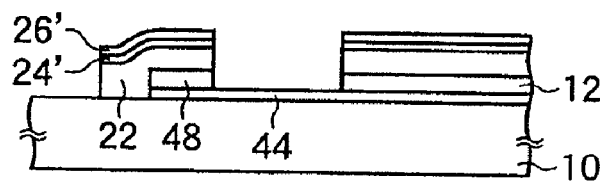
FIGS. 20A to 20D are process sectional views showing the manufacturing method of the substrate for the liquid crystal display device according to the embodiment of the invention.
Figure 20B:
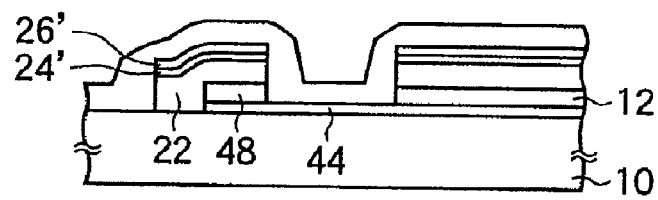
Figure 21:
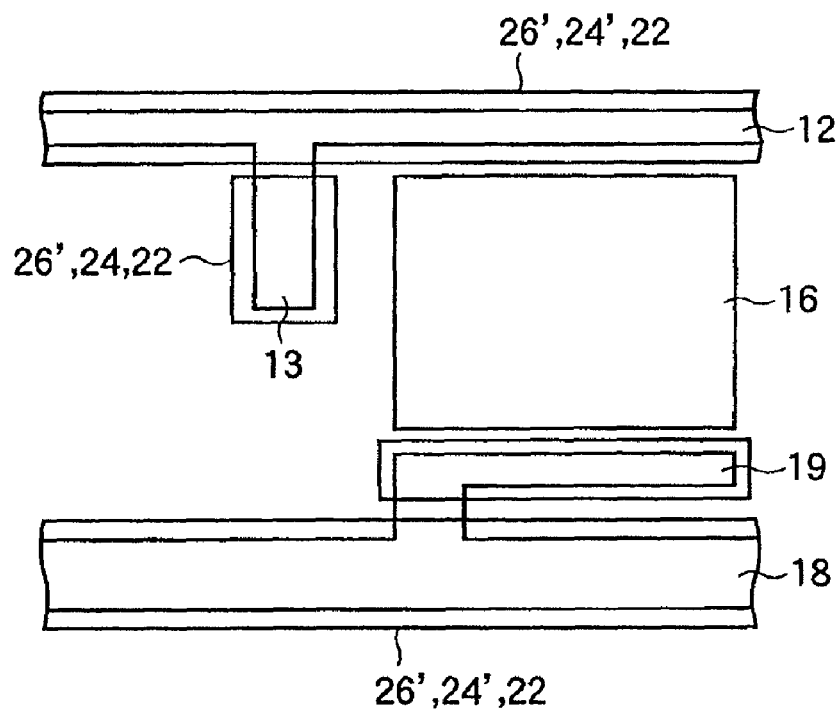
FIG. 21 is a view showing the manufacturing method of the substrate for the liquid crystal display device according to the embodiment of the invention.
Figure 22:
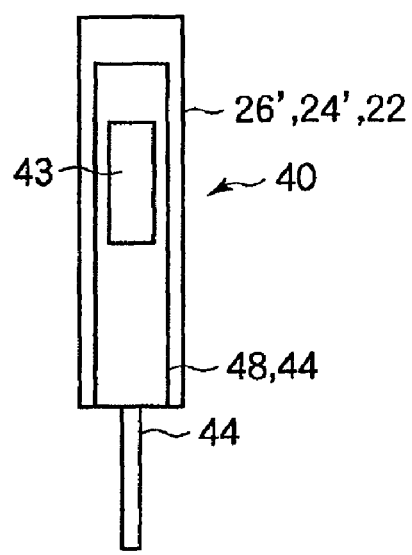
FIG. 22 is a view showing the manufacturing method of the substrate for the liquid crystal display device according to the embodiment of the invention.
Figure 23:
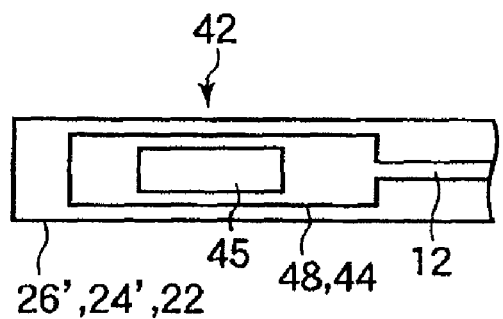
FIG. 23 is a view showing the manufacturing method of the substrate for the liquid crystal display device according to the embodiment of the invention.

Next, as shown in FIGS. 18A, 19A and 20A, the resist pattern 53 is peeled off. At this time, as shown in FIG. 21, the pixel electrode 16 is formed in the pixel region. Besides, as shown in FIG. 22, the drain bus line terminal 40 is formed of the transparent electrode layer 44 at the one end of the drain bus line 14 formed in a subsequent step. The metal layer 48 made of the same formation material as the upper layer part of the gate bus line 12, the insulating film 22, the a-Si layer 24' and the n$^+$a-Si layer 26' are laminated in this order in the outer frame of the drain bus line terminal 40. Further, as shown in FIG. 23, the gate bus line terminal 42 is formed of the transparent electrode layer 44 at the one end of the gate bus line 12. The metal layer 48 made of the same formation material as the upper layer part of the gate bus line 12, the insulating film 22, the a-Si layer 24' and the n$^+$a-Si layer 26' are laminated in this order in the outer frame of the gate bus line terminal 42. Next, as shown in FIGS. 18B, 19B and 20B, for example, an MoN layer having a thickness of 50 nm, an Al layer having a thickness of 150 nm, an MoN layer having a thickness of 90 nm and an Mo layer having a thickness of 10 nm are formed in this order to form a metal layer 54.

Figure 18C:
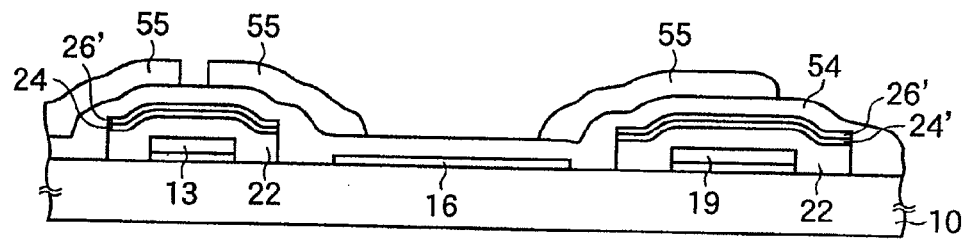
Figure 19C:
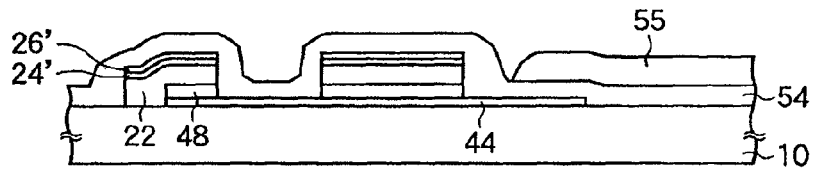
Figure 20C:
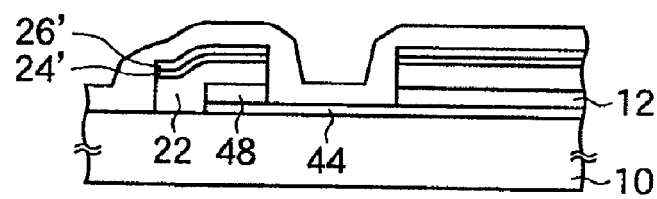

Next, a resist is coated on the whole surface of the substrate, exposure is carried out with a third photomask, and development is carried out, so that a resist pattern 55 as shown in FIGS. 18C, 19C and 20C is formed. The resist pattern 55 is formed in the formation regions of the drain bus line 14, the drain electrode 28, the source electrode 30 and the storage capacitor electrode 32.

Figure 18D:
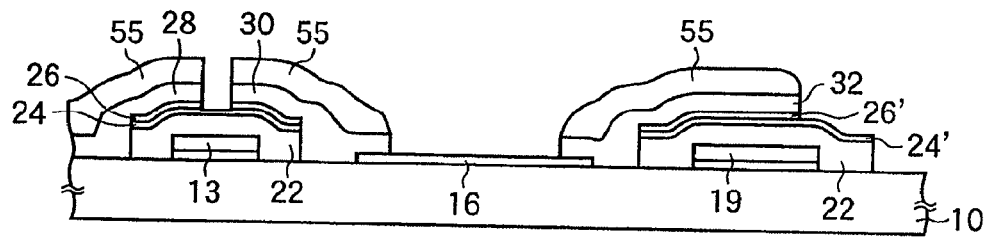
Figure 19D:
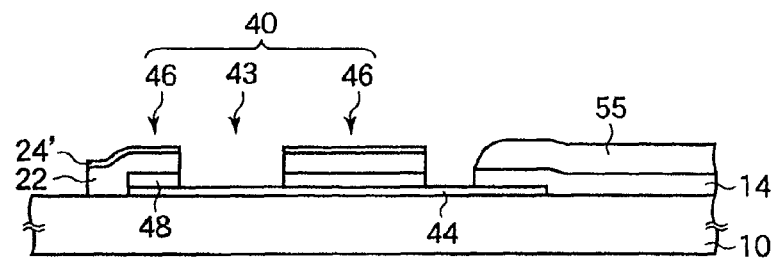
Figure 20D:
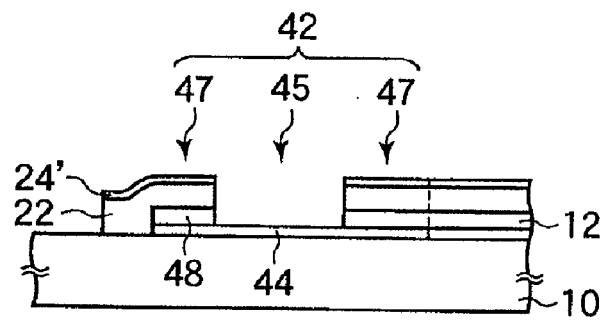

Next, as shown in FIGS. 18D, 19D and 20D, while the resist pattern 55 is used as an etching mask, the metal layer 54 and the n$^+$a-Si layer 26' are etched at the same time. By this, the drain bus line 14, the drain electrode 28, the source electrode 30 and the storage capacitor electrode 32 are formed. Besides, the outer frame part 46 of the drain bus line terminal 40 and the outer frame part 47 of the gate bus line terminal 42 are formed. In this etching, since the metal layer 54 and the n$^+$a-Si layer 26' are certainly separated at a portion just above the gate electrode 13 to form the drain electrode 28 and the source electrode 30, the surface of the active semiconductor layer 24 is also etched. By peeling off the resist pattern 55, the substrate for the liquid crystal display device according to this embodiment is completed.

According to this embodiment, since the number of times the photolithography process is repeated, which is conventionally repeated at least four times or five times or more, is decreased to three, the procedure is greatly shortened. By this, the production quantity of the liquid crystal display device can be increased and the manufacturing cost is reduced.

Besides, since the number of times the photolithography process is repeated is decreased, product defects due to faults or the like occurring in each process are decreased.

Next, a first modified example of the substrate for the liquid crystal display device according to this embodiment will be described. In the liquid crystal display device provided with the channel etch type TFT 20 as in this embodiment, when a relative patterning shift occurs between the gate electrode 13, the drain electrode 28 and the source electrode 30 at the time of division exposure, a value of parasitic capacitance Cgs varies in each division exposure region, and there is a fear that the display quality of the liquid crystal display device deteriorates.

Figure 24:
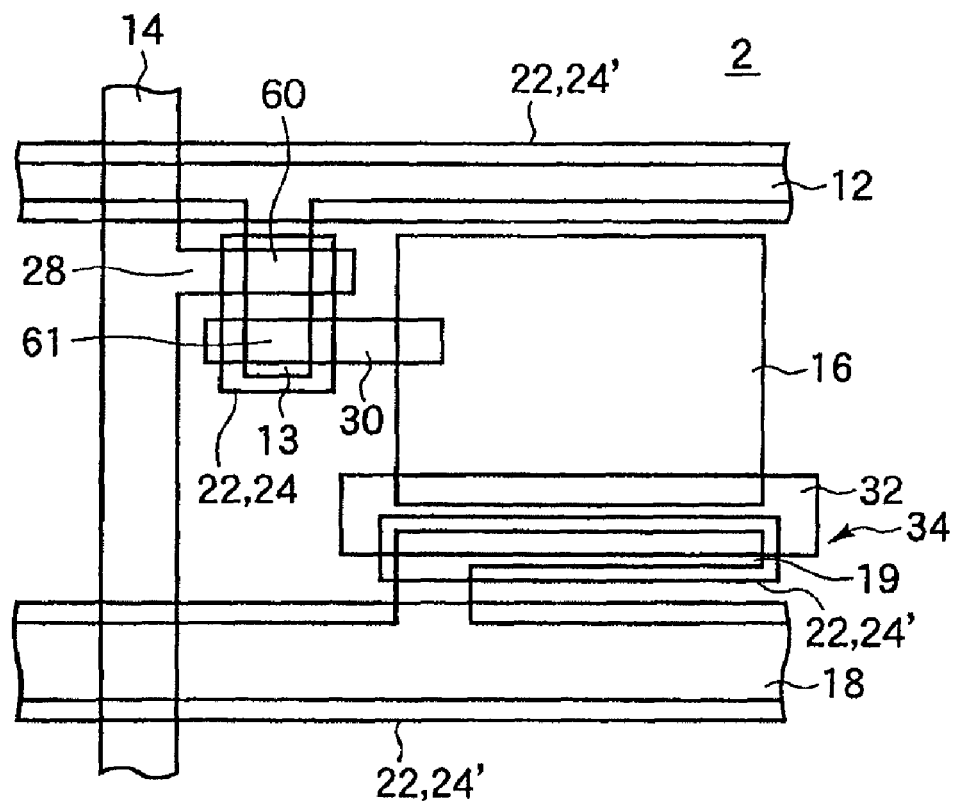
FIG. 24 is a view showing a first modified example of the substrate for the liquid crystal display device according to the embodiment of the invention.

FIG. 24 shows a schematic structure of one pixel of a TFT substrate 2 according to this modified example. As shown in FIG. 24, a TFT 20 includes an intersecting region 60 in which a gate electrode 13 and a drain electrode 28 intersect with each other crosswise through an active semiconductor layer 24. Similarly, the TFT 20 includes an intersecting region 61 in which the gate electrode 13 and a source electrode 30 intersect with each other crosswise through the active semiconductor layer 24.

In this modified example, even if a relative pattern shift occurs between the gate electrode 13, the drain electrode 28 and the source electrode 30, the area of each of the intersecting regions 60 and 61 do not vary. Accordingly, the value of the parasitic capacitance Cgs does not vary for each division exposure region, and deterioration of the display quality of the liquid crystal display device can be suppressed.

Next, a second modified example of the substrate for the liquid crystal display device according to this embodiment will be described. As already described, in the TFT substrate 2 shown in FIG. 2, the storage capacitor bus line 18 is formed to be a predetermined distance away from and adjacent to the gate bus line 12. Thus, there is a fear that a short circuit occurs between the storage capacitor bus line 18 and the gate bus line 12, and product defects are produced.

Figure 25:
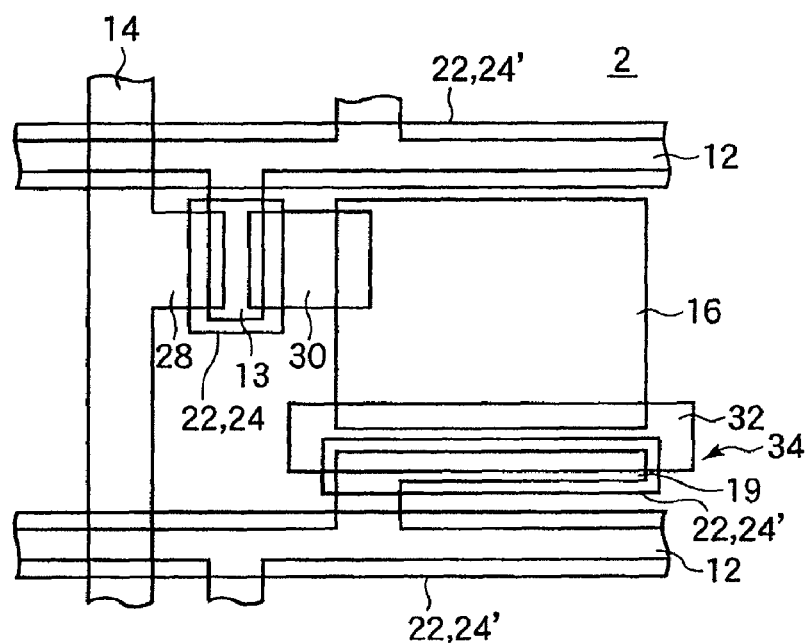
FIG. 25 is a view showing a second modified example of the substrate for the liquid crystal display device according to the embodiment of the invention.

FIG. 25 shows a schematic structure of one pixel of a TFT substrate 2 according to this modified example. As shown in FIG. 25, the TFT substrate 2 does not include the storage capacitor bus line 18, but includes a storage capacitor branch wiring line 19 led out from a gate bus line 12 in the lower part of the drawing (Cs-on-Gate structure). According to this modified example, a short circuit does not occur between the storage capacitor bus line 18 and the gate bus line 12, and product defects are not produced.

Figure 26:
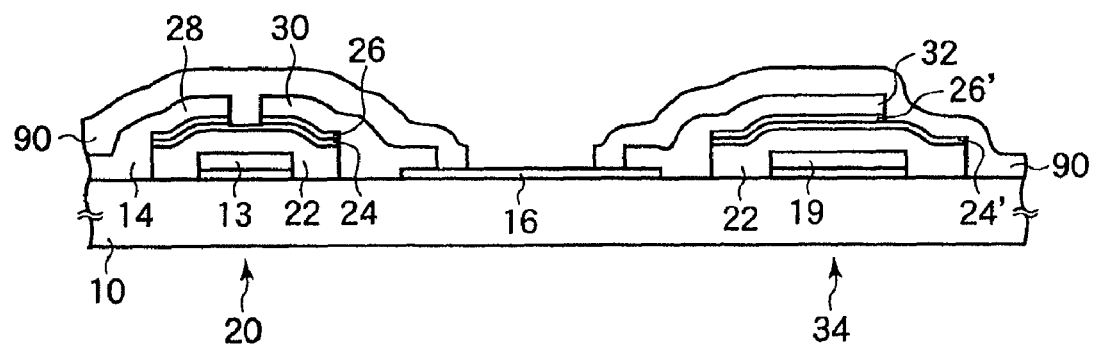
FIG. 26 is a view showing a third modified example of the substrate for the liquid crystal display device according to the embodiment of the invention.
Figure 27:
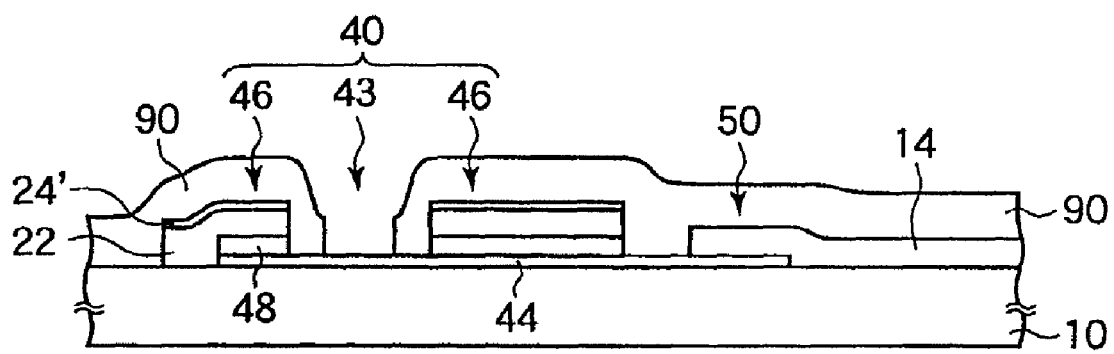
FIG. 27 is a view showing the third modified example of the substrate for the liquid crystal display device according to the embodiment of the invention.
Figure 28:
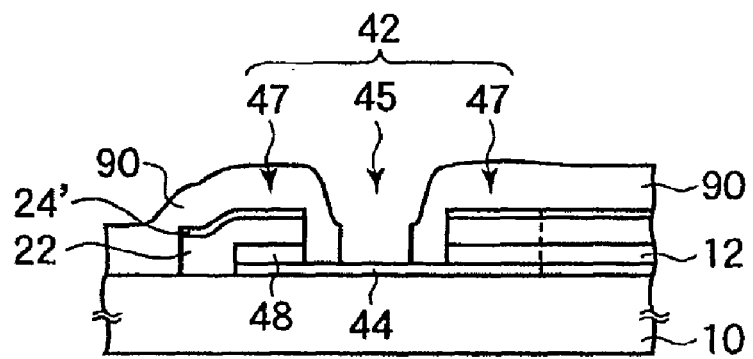
FIG. 28 is a view showing the third modified example of the substrate for the liquid crystal display device according to the embodiment of the invention.

Next, a third modified example of the substrate for the liquid crystal display device according to this embodiment will be described. FIGS. 26 to 28 show sectional structures of a substrate for a liquid crystal display device according to this modified example. FIG. 26 corresponds to the TFT substrate 2 shown in FIG. 3 and shows the sectional structure of a TFT 20, a storage capacitor 34 and a pixel region. FIG. 27 corresponds to FIG. 6 and shows the sectional structure of a drain bus line terminal 40. FIG. 28 corresponds to FIG. 8 and shows the sectional structure of a gate bus line terminal 42. As shown in FIGS. 26 to 28, in the TFT substrate 2 of this modified example, a protection film 90 is formed over the TFT 20, the storage capacitor 34, the drain bus line 14, both the bus line terminals 40 and 42, and the like. The protection film 90 is formed to cover at least a channel region of the TFT 20 exposed by channel etching. Besides, holes are opened in the protection film 90 at the pixel region (on the pixel electrode 16), at the opening 43 of the drain bus line terminal 40, and at the opening 45 of the gate bus line terminal 42.

Figure 29A:
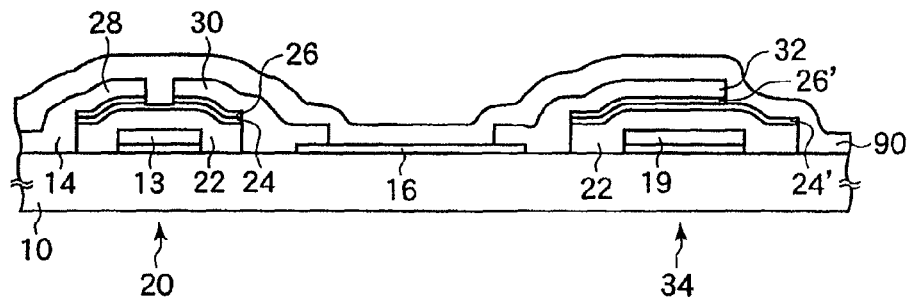
FIGS. 29A to 29C are process sectional views showing a manufacturing method of the third modified example of the substrate for the liquid crystal display device according to the embodiment of the invention.
Figure 29B:
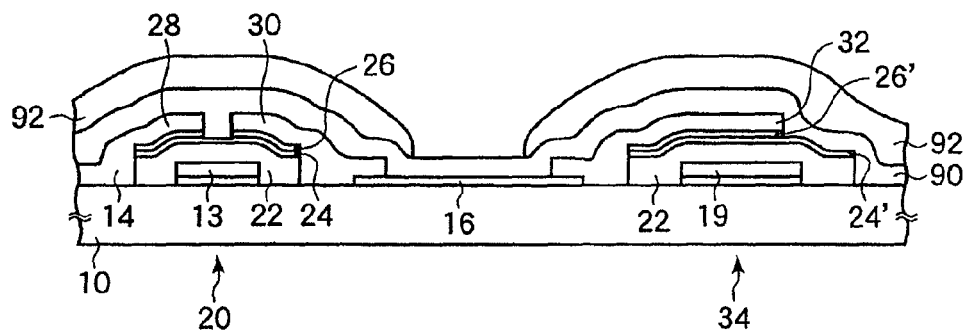
Figure 29C:
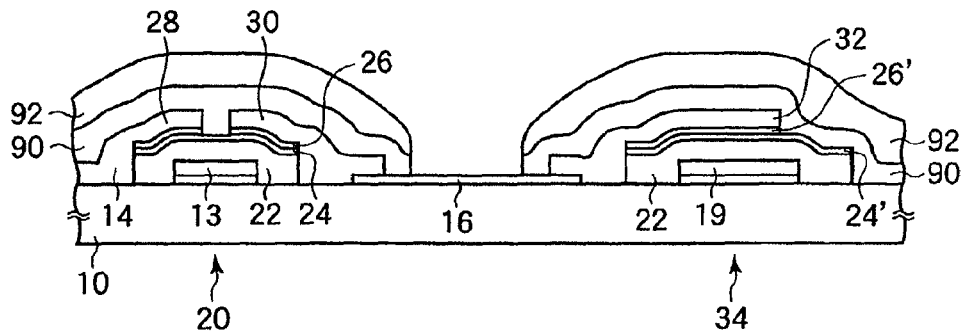
Figure 30A:
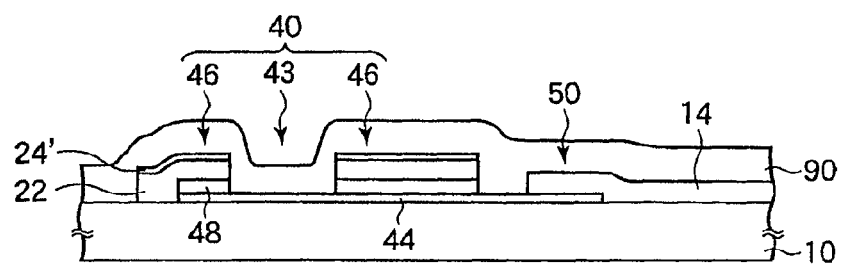
FIGS. 30A to 30C are process sectional views showing the manufacturing method of the third modified example of the substrate for the liquid crystal display device according to the embodiment of the invention.

Next, a manufacturing method of the substrate for the liquid crystal display device according to this modified example will be described. Incidentally, a process up to the formation of the drain bus line 14, the drain electrode 28, the source electrode 30 and the storage capacitor electrode 32 is the same as the manufacturing method of the liquid crystal display device according to this embodiment shown in FIGS. 9A to 23, the illustration and the description will be omitted. FIGS. 29A to 31C are process sectional views showing the manufacturing method of the substrate for the liquid crystal display device according to this modified example. FIGS. 29A to 29C correspond to FIG. 26, FIGS. 30A to 30C correspond to FIG. 27 and FIGS. 31A to 31C correspond to FIG. 28. As shown in FIGS. 29A, 30A and 31A, for example, an SiN film having a thickness of 350 nm is formed on the drain bus line 14, the drain electrode 28, the source electrode 30 and the storage capacitor electrode 32 and on the whole surface of the substrate, so that the protection film 90 is formed.

Figure 30B:
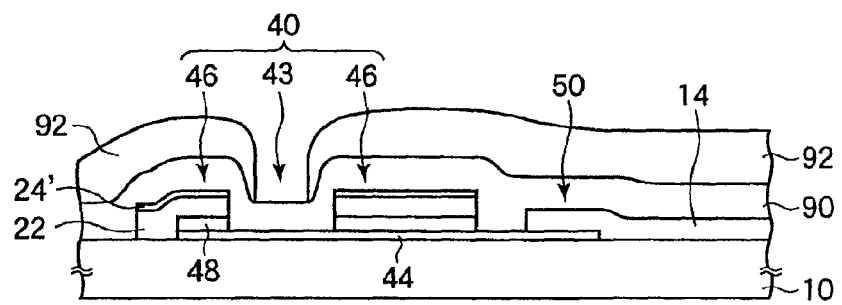
Figure 31A:
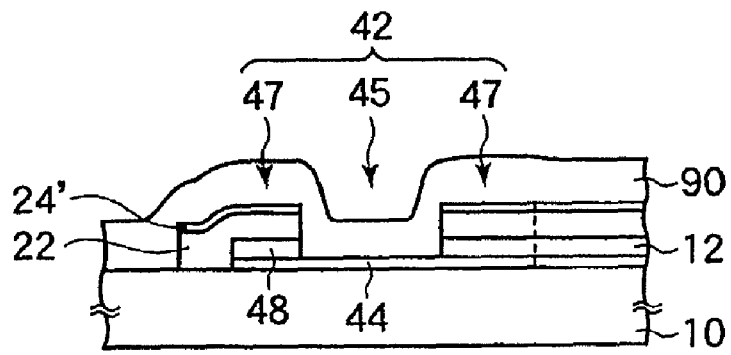
FIGS. 31A to 31C are process sectional views showing the manufacturing method of the third modified example of the substrate for the liquid crystal display device according to the embodiment of the invention.
Figure 31B:
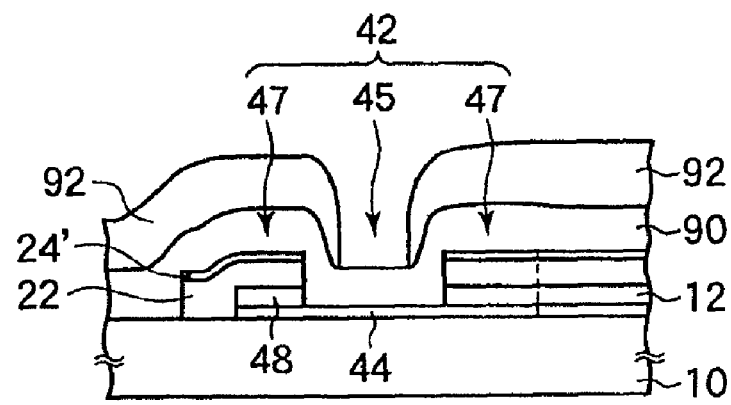

Next, a resist is coated on the whole surface of the substrate, exposure is carried out with a fourth photomask, and development is carried out, so that a resist pattern 92 as shown in FIGS. 29B, 30B and 31B is formed. The resist pattern 92 is formed in regions except for, for example, the pixel region, the opening 43 of the drain bus line terminal 40 and the opening 45 of the gate bus line terminal 42.

Figure 30C:
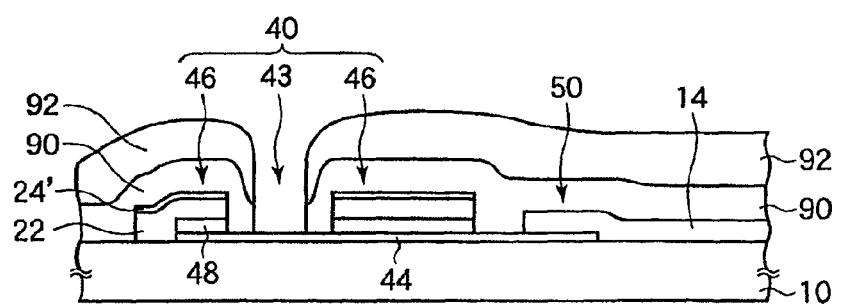
Figure 31C:
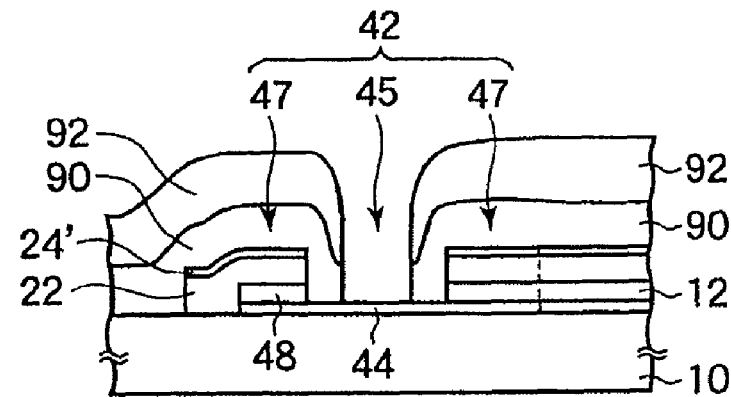
Figure 32A:
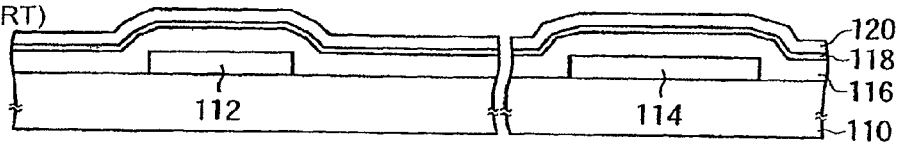
FIGS. 32A to 32F are process sectional views showing a manufacturing method of a conventional substrate for a liquid crystal display device.
Figure 32B:
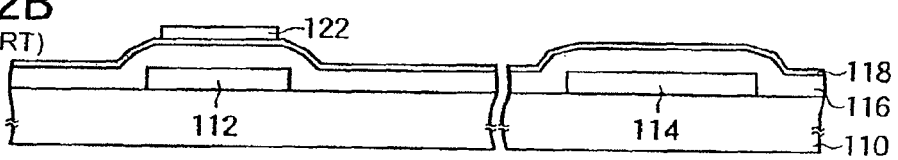
Figure 32C:
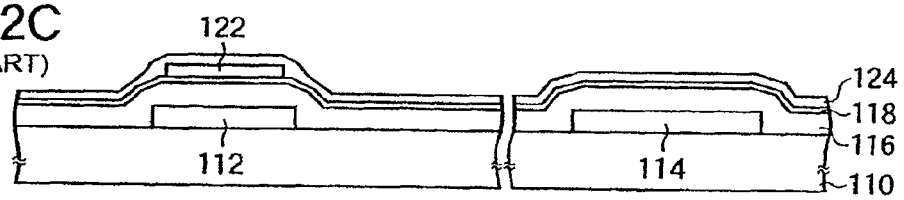
Figure 32D:
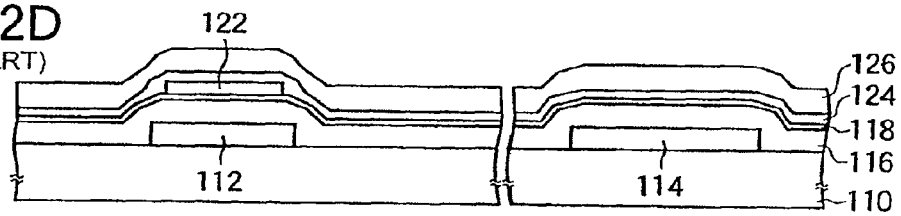
Figure 32E:
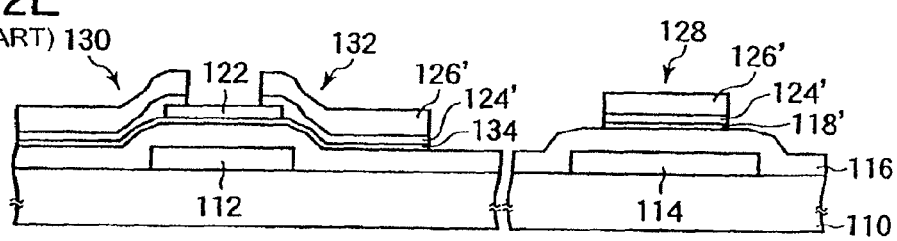
Figure 32F:
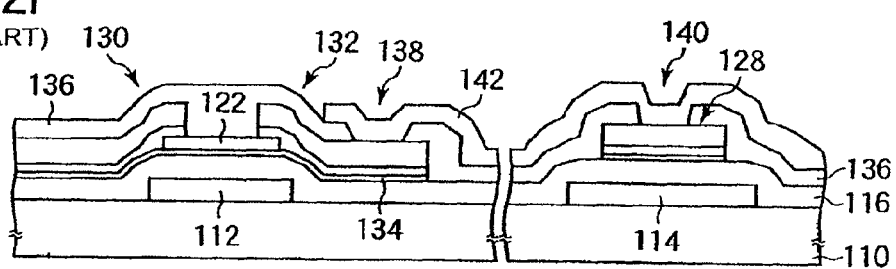

Next, while the resist pattern 92 is used as an etching mask, the protection film 90 is etched. By this, as shown in FIG. 29C, the protection film 90 in the pixel region is removed by etching, and the pixel electrode 16 is exposed. Besides, as shown in FIG. 30C, the protection film 90 at the opening 43 of the drain bus line terminal 40 is removed by etching and the transparent electrode layer 44 is exposed. Further, as shown in FIG. 31C, the protection film 90 at the opening 45 of the gate bus line terminal 42 is removed by etching, and the transparent electrode layer 44 is exposed. Thereafter, by peeling off the resist pattern 92, the substrate for the liquid crystal display device according to this modified example shown in FIGS. 26 to 28 is completed.

In this modified example, although the number of times the photolithography process is repeated is four, the protection film 90 is formed on the channel region of the TFT 20 exposed by the channel etching. Thus, the TFT substrate 2 more stable in characteristics can be obtained.

In the invention, various modifications are possible in addition to the above embodiment.

For example, in the above embodiment, although the transmission type liquid crystal display device has been exemplified, the invention is not limited to this, but can be applied to a reflection type liquid crystal display device. In the reflection type liquid crystal display device, a pixel electrode is formed of the same formation material (for example, an Al layer having a thickness of 150 nm, a Cr layer having a thickness of 150 nm, a laminate layer of a Cr layer having a thickness of 50 nm and an Al layer having a thickness of 150 nm, etc.) as the gate bus line 12.

As described above, according to the invention, it is possible to realize the substrate for the liquid crystal display device in which the manufacturing process can be cut down and the manufacturing cost is reduced, and the liquid crystal display device provided with the same.

What is claimed is:

1. A substrate for a liquid crystal display device, comprising:
   pixel regions arranged in a matrix form on a base substrate;
   a pixel electrode formed in each of the pixel regions;
   a plurality of gate bus lines formed on the base substrate in parallel with each other and in each of which plural formation materials are laminated and at least a lower layer part is formed of a same formation material as the pixel electrode;
   a plurality of drain bus lines intersecting with the gate bus lines through an insulating film and formed to be in parallel with each other;
   a thin film transistor formed in each of the pixel regions and including a gate electrode connected to the gate bus line, a drain electrode connected to the drain bus line and a source electrode connected to the pixel electrode;
   a protection film formed on the thin film transistor;
   a plurality of gate bus line terminals respectively connected to the plurality of gate bus lines; and
   a plurality of drain bus line terminals respectively connected to the plurality of drain bus lines;
   wherein holes are opened in the protection film at least at parts of the gate bus line terminals and at least at parts of the drain bus line terminals.

2. A substrate for a liquid crystal display device according to claim 1, wherein holes are opened in the protection film at the pixel regions.

3. A substrate for a liquid crystal display device, comprising:
   pixel regions arranged in a matrix form on a base substrate;
   a pixel electrode formed in each of the pixel regions;
   a plurality of gate bus lines formed on the base substrate in parallel with each other and in each of which plural formation materials are laminated and at least a lower layer part is formed of a same formation material as the pixel electrode;

a plurality of drain bus lines intersecting with the gate bus lines through an insulating film and formed to be in parallel with each other; and a thin film transistor formed in each of the pixel regions and including a gate electrode connected to the gate bus line, a drain electrode connected to the drain bus line and a source electrode connected to the pixel electrode;

wherein each of the drain bus lines includes a changeover region electrically connected to a layer made of the same formation material as the gate bus line through a layer made of the same formation material as the pixel electrode;

wherein the insulating film is formed on substantially the whole metal wiring line outside a seal agent coated region.

4. A substrate for a liquid crystal display device, comprising:

pixel regions arranged in a matrix form on a base substrate;

a pixel electrode formed in each of the pixel regions;

a plurality of gate bus lines formed on the base substrate in parallel with each other and in each of which plural formation materials are laminated and at least a lower layer part is formed of a same formation material as the pixel electrode;

a plurality of drain bus lines intersecting with the gate bus lines through an insulating film and formed to be in parallel with each other;

a thin film transistor formed in each of the pixel regions and including a gate electrode connected to the gate bus line, a drain electrode connected to the drain bus line and a source electrode connected to the pixel electrode; and a storage capacitor including a storage capacitor branch wiring line connected to a storage capacitor bus line, a storage capacitor electrode connected to the pixel electrode and the insulating film;

wherein the storage capacitor branch wiring line is connected to the storage capacitor bus line through a layer made of the same formation material as the pixel electrode.

5. A substrate for a liquid crystal display device, comprising:

pixel regions arranged in a matrix form on a base substrate;

a pixel electrode formed in each of the pixel regions;

a plurality of gate bus lines formed on the base substrate in parallel with each other and in each of which plural formation materials are laminated and at least a lower layer part is formed of a same formation material as the pixel electrode;

a plurality of drain bus lines intersecting with the gate bus lines through an insulating film and formed to be in parallel with each other;

a thin film transistor formed in each of the pixel regions and including a gate electrode connected to the gate bus line, a drain electrode connected to the drain bus line and a source electrode connected to the pixel electrode; and a storage capacitor including a storage capacitor branch wiring line connected to the gate bus line, a storage capacitor electrode connected to the pixel electrode and the insulating film;

wherein the storage capacitor branch wiring line is connected to the gate bus line through a layer made of the same formation material as the pixel electrode.

* * * * *

UNITED STATES PATENT AND TRADEMARK OFFICE
CERTIFICATE OF CORRECTION

| | | |
|---|---|---|
| PATENT NO. | : 7,932,963 B2 | Page 1 of 1 |
| APPLICATION NO. | : 12/794900 | |
| DATED | : April 26, 2011 | |
| INVENTOR(S) | : Matsubara | |

It is certified that error appears in the above-identified patent and that said Letters Patent is hereby corrected as shown below:

On the Title Page:

After "(65) Prior Publication Data" and the publication listed, insert

-- (30) Foreign Application Priority Data
Mar. 28, 2002  (JP)...... 2002-091721
Feb. 14, 2003  (JP)...... 2003-036073 --

Signed and Sealed this
Ninth Day of August, 2011

David J. Kappos
*Director of the United States Patent and Trademark Office*